United States Patent
Liu et al.

(10) Patent No.: US 9,597,676 B2
(45) Date of Patent: Mar. 21, 2017

(54) STABLE CATALYSTS FOR ELECTROLESS METALLIZATION

(71) Applicant: Rohm and Haas Electronic Materials LLC, Marlborough, MA (US)

(72) Inventors: Feng Liu, Ashland, MA (US); Maria Anna Rzeznik, Shrewsbury, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 15/221,705

(22) Filed: Jul. 28, 2016

(65) Prior Publication Data

US 2016/0332153 A1  Nov. 17, 2016

Related U.S. Application Data

(62) Division of application No. 13/844,719, filed on Mar. 15, 2013, now Pat. No. 9,441,300.

(51) Int. Cl.
| | |
|---|---|
| *B01J 33/00* | (2006.01) |
| *B01J 35/00* | (2006.01) |
| *B01J 23/50* | (2006.01) |
| *C23C 18/34* | (2006.01) |
| *C23C 18/32* | (2006.01) |
| *C23C 18/38* | (2006.01) |
| *C23C 18/30* | (2006.01) |
| *C23C 18/40* | (2006.01) |
| *C23C 18/20* | (2006.01) |
| *C23C 18/50* | (2006.01) |
| *B01J 23/44* | (2006.01) |
| *C23C 18/16* | (2006.01) |
| *C23C 18/48* | (2006.01) |
| *B01J 37/16* | (2006.01) |
| *B01J 23/40* | (2006.01) |
| *B01J 23/48* | (2006.01) |

(52) U.S. Cl.
CPC ............. *B01J 33/00* (2013.01); *B01J 23/44* (2013.01); *B01J 23/50* (2013.01); *B01J 35/0013* (2013.01); *C23C 18/2086* (2013.01); *C23C 18/30* (2013.01); *C23C 18/32* (2013.01); *C23C 18/34* (2013.01); *C23C 18/38* (2013.01); *C23C 18/40* (2013.01); *C23C 18/50* (2013.01); *B01J 23/40* (2013.01); *B01J 23/48* (2013.01); *B01J 37/16* (2013.01); *C23C 18/1607* (2013.01); *C23C 18/48* (2013.01)

(58) Field of Classification Search
None
See application file for complete search history.

(56) References Cited

U.S. PATENT DOCUMENTS

| | | | | |
|---|---|---|---|---|
| 8,057,682 | B2 * | 11/2011 | Hoag | B22F 1/0018 210/688 |
| 9,138,733 | B2 * | 9/2015 | Liu | B01J 23/44 |
| 9,144,794 | B2 * | 9/2015 | Liu | B01J 37/16 |
| 9,382,626 | B2 * | 7/2016 | Liu | C23C 18/34 |
| 2010/0200501 | A1 * | 8/2010 | Hoag | B22F 1/0018 210/620 |
| 2012/0055873 | A1 * | 3/2012 | Hoag | B22F 1/0018 210/633 |
| 2013/0216713 | A1 * | 8/2013 | Liu | B01J 23/44 427/305 |
| 2013/0216718 | A1 * | 8/2013 | Liu | B01J 37/16 427/430.1 |
| 2015/0284856 | A1 * | 10/2015 | Liu | B01J 37/16 427/305 |
| 2015/0307991 | A1 * | 10/2015 | Liu | B01J 23/44 427/305 |

FOREIGN PATENT DOCUMENTS

EP  2559486  2/2013

OTHER PUBLICATIONS

Zhu, et al, "Facile and green synthesis of well-dispersed Au nanoparticles in PAN nanofibers by tea polyphenols", J. Mater. Chem., (2012), pp. 9301-9307, vol. 22.
Zhan, et al, "Synthesis of gold nanoparticles by Cacumen Platycladi leaf extract and its simulated solution: toward the plant-mediated biosynthetic mechanism", J. Nanopart. Res., (2011), pp. 4957-4968, vol. 13.
Egorova, et al, "Synthesis of metallic nanoparticles in reverse micelles in the presence of quercetin", Colloids and Surfaces A: Physicochemical and Engineering Aspects, (2000), pp. 87-96, vol. 168.
Dubber, et al, "High-performance liquid chromatographic determinationof selected flavonols in Ginkgo biloba solid oral dosage forms", J. Pharm Pharmaceut Sci., (2004), pp. 303-309, vol. 7, No. 3.
Levchenko, et al, "Synthesis and study of gold nanoparticles stabilized by bioflavonoids", Russian Chemical Bulletin, International Edition, 2011, pp. 426-433, vol. 60, No. 3.
Ghoreishi, et al, "Green synthesis of silver and gold nanoparticles using rosa damascena and its primary application in electochemistry," Physica E, 2011, pp. 97-104, vo. 44.
Search report from corresponding Chinese 201410198227.1 application, dated Aug. 24, 2015.

\* cited by examiner

*Primary Examiner* — Joseph D Anthony
(74) *Attorney, Agent, or Firm* — John J. Piskorski

(57) ABSTRACT

Aqueous catalysts of nanoparticles of precious metals and stabilizers of flavonoid derivatives are used to electrolessly plate metal on non-conductive substrates. Such substrates include printed circuit boards.

10 Claims, No Drawings

STABLE CATALYSTS FOR ELECTROLESS METALLIZATION

The present application is a divisional application of co-pending U.S. patent application Ser. No. 13/844,719, filed Mar. 15, 2013.

FIELD OF THE INVENTION

The present invention is directed to stable aqueous precious metal catalysts for electroless metallization. More specifically, the present invention is directed to stable aqueous precious metal catalysts for electroless metallization which are tin free and are stabilized by flavonoid derivatives.

BACKGROUND OF THE INVENTION

Electroless metal deposition is a well-known process for depositing metallic layers on substrate surfaces. Electroless plating of a dielectric surface requires the prior application of a catalyst. The most commonly used method of catalyzing or activating dielectrics, such as non-conductive sections of laminated substrates used in the manufacture of printed circuit boards, is to treat the substrate with an aqueous tin/palladium colloid in an acidic chloride medium. The structure of the colloid has been extensively studied. In general, the colloid includes a palladium metal core surrounded by a stabilizing layer of tin(II) ions, essentially a shell of $SnCl_3^-$ complexes which act as surface stabilizing groups to avoid agglomeration of the colloids in suspension.

In the activation process the tin/palladium colloid catalyst is adsorbed onto a dielectric substrate, such as epoxy or polyimide containing substrate, to activate electroless metal deposition. Theoretically the catalyst functions as a carrier in the path of electron transfer from reducing agents to metal ions in the electroless metal plating bath. Although performance of electroless plating is influenced by many factors, such as additive composition of the plating solution, the activation step is key for controlling the rate and mechanism of electroless plating.

In recent years, along with the reduction in size and desired increase in the performance of electronic devices, the demand for defect free electronic circuits in the electronic packaging industry has become higher. Although the tin/palladium colloid has been commercially used as an activator for electroless metal plating for decades and has given acceptable service, it has many disadvantages which are becoming more pronounced as the demand for higher quality electronic devices increases. The stability of the tin/palladium colloid is a major concern. As mentioned above the tin/palladium colloid is stabilized by a layer of tin(II) ions and its counter anions can prevent palladium from agglomerating. The catalyst is sensitive to air and readily oxidizes to tin(IV), thus the colloid cannot maintain its colloidal structure. This oxidation is further promoted by increase in temperature and agitation during electroless plating. If the concentration of tin(II) falls to critical levels, such as close to zero, palladium metal particles grow in size, agglomerate and precipitate, thus becoming catalytically inactive. As a result there is an increase in demand for a more stable catalyst.

Considerable efforts have been made to find new and improved catalysts. Because of the high cost of palladium, much effort has been directed toward development of palladium free catalysts, such as colloidal silver catalysts. Another direction that research has taken is towards a tin free palladium catalyst since stannous chloride is costly and the oxidized tin requires a separate acceleration step. The acceleration step is an extra step in the metallization process and it often strips off some catalyst on substrates, especially on substrates of glass fiber, causing voids on the plated substrate surface. However, such tin free catalysts have shown to be insufficiently active and reliable for through-hole plating in printed circuit board manufacture. Further, such catalysts typically become progressively less active upon storage, thus rendering such catalyst unreliable and impractical for commercial use.

Alternative stabilizing moieties for tin complexes, such as polyvinylpyrrolidone (PVP) and dendrimers, have been investigated. Stable and uniform PVP protected nanoparticles have been reported by various research groups in the literature. Other metal colloids, such as silver/palladium and copper/palladium in which palladium is partially replaced by less expensive metals have also been reported in the literature; however, such alternative catalysts have not been commercially acceptable. Ionic palladium variants have been used commercially, but they require an extra reducing step. Accordingly, there is still a need for a stable and reliable electroless metal plating catalyst.

SUMMARY OF THE INVENTION

Aqueous catalyst solutions include one or more reducing agents and nanoparticles of one or more precious metals and one or more flavonoid glycosides and hydrates thereof.

Methods include providing a substrate; applying an aqueous catalyst solution to the substrate, the aqueous catalyst solution includes one or more reducing agents and nanoparticles of one or more precious metals and one or more flavonoid glycosides and hydrates thereof; and electrolessly depositing metal onto the substrate using an electroless metal plating bath.

The catalysts may be used to electrolessly plate metals on substrates, including substrates of dielectric materials and are stable upon storage as well as during electroless metal plating since they do not readily oxidize as compared to conventional tin/palladium catalysts. The flavonoid glycoside stabilizers function as do stannous chloride in conventional tin/palladium catalysts except that the flavonoid glycoside stabilizers are biodegradable, thus they do not present an environmental hazard as does stannous chloride upon disposal. The raw materials used to make the stabilizers are readily available from plant life which is essentially ubiquitous. The flavonoid glycoside stabilized precious metal catalysts enable electroless metal plating without an acceleration step, reduce or eliminate interconnect defects and enable good metal coverage of the substrate, even walls of through-holes of printed circuit boards.

DETAILED DESCRIPTION OF THE INVENTION

As used throughout this specification, the abbreviations given below have the following meanings, unless the context clearly indicates otherwise: g=gram; mg=milligram; ml=milliliter; L=liter; cm=centimeter; m=meter; mm=millimeter; μm=micron; nm=nanometers; ppm=parts per million; ° C.=degrees Centigrade; g/L=grams per liter; DI=deionized; ICD=interconnect defects; wt %=percent by weight; and $T_g$=glass transition temperature.

The terms "printed circuit board" and "printed wiring board" are used interchangeably throughout this specification. The terms "plating" and "deposition" are used interchangeably throughout this specification. The terms "a" and "an" refer to the singular and the plural. All amounts are percent by weight, unless otherwise noted. All numerical ranges are inclusive and combinable in any order except where it is logical that such numerical ranges are constrained to add up to 100%.

Aqueous nanoparticle colloidal catalyst solutions include one or more reducing agents, and nanoparticles of one or more precious metals and one or more flavonoid glycosides or hydrates thereof. Flavonoid glycosides or hydrates thereof stabilize the precious metal catalyst. Flavonoid glycosides are compounds which include a flavonoid type compound joined to one or more carbohydrates by a glycosidic bond. Flavonoids include but are not limited to flavanones, flavanonols, flavanonals, flavonols, flavanols, isoflavonoids and neoflavonoids. Carbohydrates include, but are not limited to monosaccharides such as hexoses including aldohexoses and ketohexoses and oligosaccharides such as disaccharides. Flavonoid glycosides of the precious metal catalysts may have a general formula:

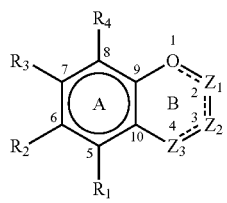

(I)

where $R_1$, $R_2$, $R_3$ and $R_4$ are independently hydrogen, hydroxyl, linear or branched $(C_1-C_6)$alkoxy, linear or branched $(C_1-C_6)$acetate or —O-carbohydrate, preferably one of $R_1$, $R_2$, $R_3$ and $R_4$ is —O-carbohydrate; the dotted lines of ring B are optional double bonds; $Z_1$ is >C=O or a structure having formula:

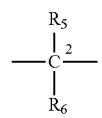

(II)

where $R_5$ and $R_6$ are independently hydrogen, or ring C, when $Z_1$ forms a double bond with the carbon at position 3 of ring B, only one of $R_5$ and $R_6$ is present and joined to the carbon at position 2, preferably $R_5$ or $R_6$ is ring C; $Z_2$ is a structure having formula:

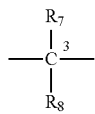

(III)

where $R_7$ and $R_8$ are independently hydrogen, hydroxyl, ring C or —O-carbohydrate, when $Z_2$ forms a double bond with the carbon at position 2 or 4 of ring B, only one of $R_7$ and $R_8$ is present and joined with the carbon of position 3; $Z_3$ is >C=O or a structure having formula:

(IV)

where $R_9$ and $R_{10}$ are hydrogen or ring C, when $Z_3$ forms a double bond with the carbon at position 3 of ring B, only one of $R_9$ and $R_{10}$ is present and joined to the carbon at position 4, preferably $Z_3$ is >C=O; and

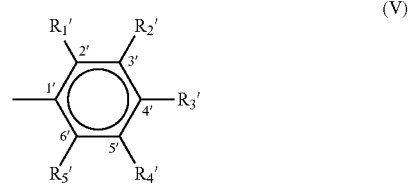

(V)

$R_{1'}$, $R_{2'}$, $R_{3'}$, $R_{4'}$ and $R_{5'}$ of ring C are independently hydrogen, hydroxyl, linear or branched $(C_1-C_6)$alkoxy, linear or branched $(C_1-C_6)$acetate or —O-carbohydrate, preferably at least one of $R_{1'}$-$R_{5'}$ is hydroxyl. At least one of ring A, B or C includes —O-carbohydrate, preferably ring A or B is bonded to —O-carbohydrate, and there is at least one hydroxyl on ring A or ring C, preferably ring A and ring C include at least one hydroxyl group.

Preferred flavonoid glycosides include compounds where at least one of $R_1$-$R_4$ of ring A is hydroxyl and ring A may include a —O-carbohydrate; ring B may or may not include a double bond, when it does include a double bond, preferably, the double bond is between the carbons at position 2 and position 3; $Z_1$ may include hydrogen or ring C, $Z_2$ may include hydrogen or a —O-carbohydrate, preferably —O-carbohydrate is joined to ring B at $Z_2$, position 3; $Z_3$ is >C=O and ring C includes at least one hydroxyl group and may further include $(C_1-C_3)$alkoxy and hydrogen. Examples of such compounds are Rutin, robinin, diosmin and hydrates thereof.

More preferred flavonoid glycosides include compounds where at least one of $R_1$-$R_4$ is hydroxyl and a —O-carbohydrate, preferably, only one of $R_1$-$R_4$ is hydroxyl and —O-carbohydrate with the remainder hydrogen; ring B does not include any double bonds or hydroxyl groups, $Z_1$ is formula (II) and $Z_2$ is formula (III) where at least one of $R_7$-$R_{10}$ is ring C, preferably, $R_7$ or $R_8$ is ring C with the remainder hydrogen and $Z_3$ is >C=O; at least one of $R_{1'}$-$R_{5'}$ of ring C is hydroxyl, preferably, only one of $R_{1'}$-$R_{5'}$ is hydroxyl with the remainder hydrogen or hydrogen and at least one $(C_1-C_3)$alkoxy. Examples of such flavonoid glycosides are flavanone glycosides such as naringin, hesperidine and hydrates thereof.

Carbohydrates include but are not limited to hexoses such as aldohexoses such as allose, altrose, galactose, glucose, gulose, iodose, mannose, rhamnose and talose, ketohexoses such as fructose, psicose, sorbose and tagatose; pentoses such as ribose, ribulose and deoxyribose; oligosaccharides such as disaccharides such as saccharose, lactose, maltose, rutinose and trehalose. Preferably the carbohydrates are hexoses such as galactose, glucose and rhamnose and the disaccharide rutinose, more preferably the carbohydrates are glucose, rhamnose and rutinose.

The flavonoid glycosides are included in the aqueous catalyst in sufficient amounts to provide particle stabilization. Mixtures of the various stabilizing flavonoid glycosides described above may be included in the aqueous catalysts. Minor experimentation may be done to determine the amount of a particular stabilizer or combination of stabilizers to stabilize a catalyst. In general, one or more stabilizing compounds are included in the aqueous catalyst in amounts of 10 mg/L to 5 g/L, preferably from 0.2 g/L to 2 g/L.

One or more reducing agents are included to reduce metal ions to metal. Conventional reducing agents known to reduce metal ions to metal may be used. Such reducing agents include, but are not limited to dimethylamine borane, sodium borohydride, ascorbic acid, iso-ascorbic acid, sodium hypophosphite, hydrazine hydrate, formic acid and formaldehyde. Reducing agents are included in amounts to reduce substantially all of the metal ions to metal. Such amounts are generally conventional amounts and are well known by those of skill in the art. Typically reducing agents are included in the aqueous catalyst solution in amounts of 50 mg/L to 500 mg/L.

Sources of precious metals include any of the conventional water soluble precious metal salts known in the art and literature which provide precious metals having catalytic activity. Mixtures of two or more catalytic precious metals may be used. Such salts are included to provide metal in amounts of 10 ppm to 2000 ppm, preferably from 20 ppm to 500 ppm. Palladium salts include, but are not limited to palladium chloride, palladium sodium chloride and palladium potassium chloride. Silver salts include, but are not limited to silver nitrate, silver fluoride, silver oxide, silver p-toluenesulfonate, silver sodium thiosulfate and silver potassium cyanide. Gold salts include, but are not limited to gold cyanide, gold trichloride, gold tribromide, potassium gold chloride, potassium gold cyanide, sodium gold chloride and sodium gold cyanide. Platinum salts include, but are not limited to platinum chloride and platinum sulfate. Iridium salts include, but are not limited to, iridium tribromide and iridium potassium chloride. Typically the salts are palladium, silver, gold and platinum. Preferably the salts are silver, palladium and platinum. More preferably the salts are palladium and silver.

Optionally, one or more antioxidants may be included in the aqueous catalyst solutions. Conventional antioxidants may be included and may be included in conventional amounts. Typically antioxidants are included in amounts of 0.1 g/l to 10 g/l, preferably from 0.2 g/L to 5 g/L. Such antioxidants include, but are not limited to, ascorbic acid, phenolic acid, polyphenolic compounds, such as but not limited to, hydroxybenzoic acid and derivatives, gallic acid, hydroxybenzoaldehydes, catechol, hydroquinone and catechin.

The components which make up the aqueous catalyst may be combined in any order. Any suitable method known in the art and literature may be used to prepare the aqueous catalyst. While the specific parameters and amounts of components may vary from one method to the other, in general, one or more of the flavonoid glycosides is first solubilized in a sufficient amount of water. One or more sources of metal as an aqueous solution are combined with the stabilizer solution with vigorous agitation to form a uniform mixture. An aqueous solution containing one or more reducing agents is then mixed with the mixture of stabilizers and metal salts with vigorous agitation to reduce the metal ions to metal. The molar ratio of metal to stabilizer may range from 1:0.1 to 1:5, preferably from 1:0.2 to 1:1. The process steps and solution are typically done at room temperature; however, temperatures may be varied to assist in solubilizing reaction components and to encourage reduction of metal ions. While not being bound by theory, the stabilizers may coat or surround portions or most of the metal to stabilize the nanoparticle colloidal catalyst solution. The metal nanoparticles may range in size from 1 nm to 1000 nm or such as from 2 nm to 500 nm. Preferably the nanoparticles range in size from 2 nm to 100 nm, more preferably from 2 nm to 10 nm.

One or more acids may be added to the catalyst to provide a pH range of less than 7, preferably from 1-6.5, more preferably from 2-6. Inorganic or organic acids may be used in sufficient amounts to maintain the pH at the desired range. Mixtures of inorganic and organic acids also may be used. Examples of inorganic acids are hydrochloric acid, sulfuric acid and nitric acid. Organic acids include mono- and polycarboxylic acids, such as dicarboxylic acids. Examples of organic acids are benzoic acid and its derivatives such as hydroxybenzoic acid, ascorbic acid, iso-ascorbic acid, malic acid, maleic acid, gallic acid, acetic acid, citric acid, oxalic acid and tartaric acid.

The nanoparticle colloidal catalysts may be used to electrolessly metal plate various substrates. Substrates include, but are not limited to materials including inorganic and organic substances such as glass, ceramics, porcelain, resins, paper, cloth and combinations thereof. Metal-clad and unclad materials also are substrates which may be metal plated using the catalyst. Preferably the substrates are metal-clad and unclad printed circuit boards.

Printed circuit boards include metal-clad and unclad boards with thermosetting resins, thermoplastic resins and combinations thereof, including fiber, such as fiberglass, and impregnated embodiments of the foregoing.

Thermoplastic resins include, but are not limited to, acetal resins, acrylics, such as methyl acrylate, cellulosic resins, such as ethyl acetate, cellulose propionate, cellulose acetate butyrate and cellulose nitrate, polyethers, nylon, polyethylene, polystyrene, styrene blends, such as acrylonitrile styrene and copolymers and acrylonitrile-butadiene styrene copolymers, polycarbonates, polychlorotrifluoroethylene, and vinylpolymers and copolymers, such as vinyl acetate, vinyl alcohol, vinyl butyral, vinyl chloride, vinyl chloride-acetate copolymer, vinylidene chloride and vinyl formal.

Thermosetting resins include, but are not limited to, allyl phthalate, furane, melamine-formaldehyde, phenol-formaldehyde and phenol-furfural copolymers, alone or compounded with butadiene acrylonitrile copolymers or acrylonitrile-butadiene-styrene copolymers, polyacrylic esters, silicones, urea formaldehydes, epoxy resins, allyl resins, glyceryl phthalates and polyesters.

The catalysts may be used to plate both low and high $T_g$ resins. Low $T_g$ resins have a $T_g$ below 160° C. and high $T_g$ resins have a $T_g$ of 160° C. and above. Typically high $T_g$ resins have a $T_g$ of 160° C. to 280° C. or such as from 170° C. to 240° C. High $T_g$ polymer resins include, but are not limited to, polytetrafluoroethylene (PTFE) and polytetrafluoroethylene blends. Such blends include, for example, PTFE with polypheneylene oxides and cyanate esters. Other classes of polymer resins which include resins with a high $T_g$ include, but are not limited to, epoxy resins, such as difunctional and multifunctional epoxy resins, bimaleimide/triazine and epoxy resins (BT epoxy), epoxy/polyphenylene oxide resins, acrylonitrile butadienestyrene, polycarbonates (PC), polyphenylene oxides (PPO), polypheneylene ethers (PPE), polyphenylene sulfides (PPS), polysulfones (PS), polyamides, polyesters such as polyethyleneterephthalate (PET) and polybutyleneterephthalate (PBT), polyetherketones (PEEK), liquid crystal polymers, polyurethanes, polyetherimides, epoxies and composites thereof.

The flavonoid glycoside/precious metal nanoparticle colloidal catalyst may be used to deposit metals on the walls of through-holes or vias of printed circuit boards. The catalysts may be used in both horizontal and vertical processes of manufacturing printed circuit boards.

The aqueous catalysts may be used with conventional electroless metal plating baths. Typically, the metal is chosen from copper, copper alloys, nickel or nickel alloys. Preferably the metal is chosen from copper and copper alloys, more preferably the metal is copper.

Typically sources of copper ions include, but are not limited to water soluble halides, nitrates, acetates, sulfates and other organic and inorganic salts of copper. Mixtures of one or more of such copper salts may be used to provide copper ions. Examples include copper sulfate, such as copper sulfate pentahydrate, copper chloride, copper nitrate, copper hydroxide and copper sulfamate. Conventional amounts of copper salts may be used in the baths. Copper ion concentrations in the bath may range from 0.5 g/L to 30 g/L or such as from 1 g/L to 20 g/L or such as from 5 g/L to 10 g/L.

One or more alloying metals also may be included in the electroless baths. Such alloying metals include, but are not limited to nickel and tin. Examples of copper alloys include copper/nickel and copper/tin. Typically the copper alloy is copper/nickel.

Sources of nickel ions for nickel and nickel alloy electroless baths may include one or more conventional water soluble salts of nickel. Sources of nickel ions include, but are not limited to nickel sulfates and nickel halides. Sources of nickel ions may be included in the electroless alloying compositions in conventional amounts. Typically sources of nickel ions are included in amounts of 0.5 g/L to 10 g/L or such as from 1 g/l to 5 g/L.

The method steps used in metalizing a substrate may vary depending on whether the surface to be plated is metal or dielectric. Conventional steps used for electrolessly metal plating a substrate may be used with the catalysts; however, the aqueous stabilized metal catalysts do not require an acceleration step as in many conventional electroless plating processes. Accordingly, acceleration steps are preferably excluded when using the catalyst. In general, the catalyst is applied to the surface of the substrate to be electrolessly plated with a metal followed by application of the metal plating bath. Electroless metal plating parameters, such as temperature and time may be conventional. Conventional substrate preparation methods, such as cleaning or degreasing the substrate surface, roughening or micro-roughening the surface, etching or micro-etching the surface, solvent swell applications, desmearing through-holes and various rinse and anti-tarnish treatments may be used. Such methods and formulations are well known in the art and disclosed in the literature.

In general, when the substrate to be metal plated is a dielectric material such as on the surface of a printed circuit board or on the walls of through-holes, the boards are rinsed with water and cleaned and degreased followed by desmearing the through-hole walls. Typically prepping or softening the dielectric surface or desmearing of the through-holes begins with application of a solvent swell.

Any conventional solvent swell may be used. The specific type may vary depending on the type of dielectric material. Examples of dielectrics are disclosed above. Minor experimentation may be done to determine which solvent swell is suitable for a particular dielectric material. The $T_g$ of the dielectric often determines the type of solvent swell to be used. Solvent swells include, but are not limited to, glycol ethers and their associated ether acetates. Conventional amounts of glycol ethers and their associated ether acetates may be used. Examples of commercially available solvent swells are CIRCUPOSIT CONDITIONER™ 3302, CIRCUPOSIT HOLE PREP™ 3303 and CIRCUPOSIT HOLE PREP™ 4120 (obtainable from Rohm and Haas Electronic Materials, Marlborough, Mass.).

Optionally, the substrate and through-holes are rinsed with water. A promoter is then applied. Conventional promoters may be used. Such promoters include sulfuric acid, chromic acid, alkaline permanganate or plasma etching. Typically alkaline permanganate is used as the promoter. An example of a commercially available promoter is CIRCUPOSIT PROMOTER™ 4130 available from Rohm and Haas Electronic Materials, Marlborough, Mass.

Optionally, the substrate and through-holes are rinsed again with water. A neutralizer is then applied to neutralize any residues left by the promoter. Conventional neutralizers may be used. Typically the neutralizer is an aqueous alkaline solution containing one or more amines or a solution of 3 wt % peroxide and 3 wt % sulfuric acid. Optionally, the substrate and through-holes are rinsed with water and then dried.

After the solvent swelling and desmearing an acid or alkaline conditioner may be applied. Conventional conditioners may be used. Such conditioners may include one or more cationic surfactants, non-ionic surfactants, complexing agents and pH adjusters or buffers. Examples of commercially available acid conditioners are CIRCUPOSIT CONDITIONER™ 3320 and CIRCUPOSIT CONDITIONER™ 3327 available from Rohm and Haas Electronic Materials, Marlborough, Mass. Suitable alkaline conditioners include, but are not limited to, aqueous alkaline surfactant solutions containing one or more quaternary amines and polyamines. Examples of commercially available alkaline surfactants are CIRCUPOSIT CONDITIONER™ 231, 3325, 813 and 860 available from Rohm and Haas Electronic Materials. Optionally, the substrate and through-holes are rinsed with water.

Conditioning may be followed by micro-etching. Conventional micro-etching compositions may be used. Micro-etching is designed to provide a micro-roughened metal surface on exposed metal (e.g. innerlayers and surface etch) to enhance subsequent adhesion of deposited electroless and later electroplate. Micro-etches include, but are not limited to, 60 g/L to 120 g/L sodium persulfate or sodium or potassium oxymonopersulfate and sulfuric acid (2%) mixture, or generic sulfuric acid/hydrogen peroxide. An example of a commercially available micro-etching composition is CIRCUPOSIT MICROETCH™ 3330 available from Rohm and Haas Electronic Materials. Optionally, the substrate is rinsed with water.

Optionally a pre-dip is then applied to the micro-etched substrate and through-holes. The pre-dip helps to stabilize the catalyst bath pH and clean the metal surface. Preferably the pre-dip is used because it helps improve ICD reliability. Conventional pre-dip aqueous solutions of inorganic or organic acids with a pH range typically from 3-5 may be used. An example of an inorganic acid solution is 2% to 5% hydrochloric acid. Organic acids include but are not limited to carboxylic acids, such as oxalic acid and glyoxylic acid. Optionally, the substrate is rinsed with cold water.

A stabilized flavonoid glycoside/precious metal nanoparticle colloidal catalyst is then applied to the substrate and through-holes. The substrate and through-holes optionally may be rinsed with water after application of the catalyst.

The substrate and walls of the through-holes are then plated with metal, such as copper, copper alloy, nickel or nickel alloy with an electroless bath. Preferably copper is plated on the walls of the through-holes. Plating times and temperatures may be conventional. Typically metal deposition is done at temperatures of 20° C. to 80°, more typically from 30° C. to 60° C. The substrate may be immersed in the electroless plating bath or the electroless bath may be sprayed onto the substrate. Typically, deposition may be done for 5 seconds to 30 minutes; however, plating times may vary depending on the thickness of the metal on the substrate.

Optionally anti-tarnish may be applied to the metal. Conventional anti-tarnish compositions may be used. An example of a commercially available anti-tarnish is ANTI TARNISH™ 7130 (available from Rohm and Haas Electronic Materials). The substrate may optionally be rinsed and then the boards may be dried.

Further processing may include conventional processing by photoimaging and further metal deposition on the substrates such as electrolytic metal deposition of, for example, copper, copper alloys, tin and tin alloys.

The catalysts may be used to electrolessly plate metals on substrates, including substrates of dielectric materials and are stable upon storage as well as during electroless metal plating since they do not readily oxidize as compared to conventional tin/palladium catalysts. The flavonoid glycoside stabilizers function as do stannous chloride in conventional tin/palladium catalysts except that the flavonoid glycoside stabilizers are biodegradable, thus they do not present an environmental hazard as does stannous chloride upon disposal. The raw materials used to make the stabilizers are readily available from plant life which is essentially ubiquitous. The flavonoid glycoside stabilized precious metal catalysts enable electroless metal plating without an acceleration step, reduce or eliminate ICDs and enable good metal coverage of the substrate, even walls of through-holes of printed circuit boards.

The following examples are not intended to limit the scope of the invention but are intended to further illustrate it.

EXAMPLE 1

190 mg naringin dihydrate was dissolved in a beaker containing 750 ml of DI water. The water was heated to 50° C. to assist in dissolving the naringin dihydrate. 290 mg $Na_2PdCl_4$ in 25 ml of DI water was added to the solution of naringin with stirring to form a substantially uniform orange colored solution. 93 mg $NaBH_4$ in 10 ml of DI water was added to the substantially uniform solution with vigorous stir bar agitation. The solution changed in color from orange to black indicating the formation of colloidal palladium nanoparticles. The molar ratio of palladium metal to naringin was 1:0.3. The beaker containing the aqueous colloidal naringin and palladium nanoparticles was then placed in a 50° C. water bath for 12 hours to test the shelf-life stability of the nanoparticles. The pH was monitored over the 12 hour period with an ACCUMET AB15 pH meter and fluctuated from 7 to 9 due to the formation of $H_2$ gas and hydroxide in solution from the excess $NaBH_4$. There was no observable black precipitate at the bottom of the beaker after the 12 hour period. Accordingly, the nanoparticles were stable.

Multiple aliquots of the catalyst solution were taken from the foregoing stock solution to make a catalyst working bath with palladium concentration ranging from 25 ppm to 100 ppm. Either ascorbic acid or glyoxylic acid ranging from 0.1 g/L to 5 g/L was added to each aliquot to adjust the catalyst bath pH to 3-6. All samples were stable and all initiated copper metal electroless plating on SY-1141 laminates from Shengyi.

EXAMPLE 2

190 mg naringin dihydrate was dissolved in a beaker containing 750 ml of DI water. The water was heated to 50° C. to assist in dissolving the naringin dihydrate. 440 mg $Na_2PdCl_4$ in 25 ml of DI water was added to the solution of naringin with stirring to form a substantially uniform orange colored solution. 140 mg $NaBH_4$ in 10 ml of DI water was added to the substantially uniform solution with vigorous stir bar agitation. The solution changed in color from orange to black indicating the formation of colloidal palladium nanoparticles. The molar ratio of palladium metal to naringin was 1:0.2 and the pH of the bath was between 8 and 9. The beaker containing the aqueous colloidal palladium nanoparticles was then placed in a 50° C. water bath for 12 hours to test the stability of the nanoparticles. There was no observable formation of black precipitate at the bottom of the beaker. The colloidal nanoparticles were stable over the 12 hour period.

EXAMPLE 3

Two sample aliquots of equal volume of the naringin/palladium colloidal nanoparticle catalyst made in Example 2 were removed from the stock solution and diluted with DI water such that the concentration of the palladium in each sample was 50 ppm. A sufficient amount of 2,4-dihydroxybenzoic acid was added to one sample to adjust the pH to 3 and the other sample had its pH adjusted to 3 by adding sufficient amounts of glyoxylic acid.

The naringin/palladium colloidal nanoparticle samples were tested for copper electroless plating performance on two sets of six different laminates: TUC-662, SY-1141, SY-1000-2, IT-158, IT-180 and NPG-150. IT-158 and IT-180 were obtained from Taiwan ITEQ Corporation, NPG-150 was from Nanya Corporation, TUC-662 was obtained from Taiwan Union Technology Corporation and SY-1141 and SY-1000 were obtained from Shengyi. The $T_g$ values ranged from 140° C. to 180° C. Each laminate was 5 cm×12 cm and had a plurality of through-holes. A surface of each laminate was treated as follows:

1. Each laminate was immersed into a solvent swell which included ethylene glycol dimethyl ether and water at a volume to volume ratio of 1:2 for 7 minutes at 80° C.;
2. Each laminate was then removed from the solvent swell and rinsed with cold tap water for 4 minutes;
3. Each laminate was then treated with a permanganate aqueous solution which included 1% potassium permanganate at a pH above 10 at 80° C. for 10 minutes;
4. Each laminate was then rinsed for 4 minutes in cold tap water;
5. The laminates were then treated with a neutralizer solution of 3 wt % peroxide and 3 wt % sulfuric acid for 2 minutes at room temperature;
6. Each laminate was then rinsed with cold tap water for 4 minutes;
7. Each laminate was then immersed in an aqueous bath containing 3% CIRCUPOSIT CONDITIONER™ 231 aqueous acid conditioner for 5 minutes at 40° C.;

8. Each laminate was then rinsed with cold tap water for 4 minutes;
9. MICROETCH™ 748 solution was then applied to each laminate for 2 minutes at room temperature;
10. Each laminate was then rinsed with cold tap water for 4 minutes;
11. The laminates were then immersed in a pre-dip aqueous acid solution containing 2 g/L glyoxylic acid and 1 g/L oxalic acid for 2 minutes at room temperature;
12. The laminates were then primed for 5 minutes at 40° C. with one of the two samples of naringin/palladium catalysts;
13. The laminates were then rinsed with cold water for 4 minutes;
14. The laminates were then immersed in CIRCUPOSIT™ 880 Electroless Copper plating bath at 40° C. and at a pH of 13 and copper was deposited on the substrates for 15 minutes;
15. The copper plated laminates were then rinsed with cold water for 2 minutes;
16. Six of the copper plated laminates were then placed into a conventional convection oven and dried for 20 minutes at 105° C. and the other six laminates were plated with electrolytic copper for ICD performance as described below;
17. After drying, the first set of six copper plated laminates was placed in a conventional laboratory dessicator for 20 minutes or until they cooled to room temperature; and
18. The first set of six copper laminates was then tested for adhesion using the conventional Scotch tape test method.

All of the plated copper laminates had bright shinny copper deposits and a smooth appearance under a conventional microscope and passed the Scotch tape test. There was no observable copper metal stuck to the Scotch tape after removal of the tape from the copper laminates.

Each laminate was sectioned laterally to expose the copper plated walls of the through-holes. Multiple lateral sections 1 mm thick were taken from the walls of the sectioned through-holes to determine the through-hole wall coverage for the boards. Ten though-holes were examined for each laminate. The European Backlight Grading Scale was used. The 1 mm sections from each board were placed under a conventional optical microscope of 50× magnification. The quality of the copper deposits was determined by the amount of light that was observed under the microscope. If no light was observed the section was completely black and was rated a 5 on the backlight scale indicating complete copper coverage of the through-hole. If light passed through the entire section without any dark areas, this indicated that there was very little to no copper metal deposition on the wall and the section was rated 0. If sections had some dark regions as wells as light regions, they were rated between 0 and 5. The average backlight ratings for the laminates ranged from 4.6 to 4.9. The results indicated that the catalyst formulation was acceptable for commercial use by industry standards.

The second set of laminates which was electrolessly copper plated also had a bright shinny and smooth appearance. These were electroplated in ELECTROPOSIT™ 1100 Copper Electroplating bath (available from Rohm and Haas Electronic Materials LLC, Marlborough, Mass.) with a 1.5 A/dm$^2$ current density for 120 minutes to achieve an electrolytic copper thickness of 1-1.3 µm. Each laminate was then cut and the portion with the holes to be inspected was placed in an oven at 125° C. for six hours. The laminates subsequently underwent 6× ten second solder floats at 288° C., followed by conventional moulding, grinding and polishing. Each was visually inspected with a conventional optical microscope for ICDs. No ICDs were detected on the six laminates.

EXAMPLE 4

The plating method described in Example 3 above was repeated except that the concentration of the palladium in the colloidal nanoparticle catalyst was increased to 100 ppm. The samples appeared stable with no observable precipitation. All of the plated copper laminates had bright shinny copper deposits with good morphology and passed the Scotch tape test. There was no observable copper metal stuck to the Scotch tape after removal of the tape from the copper laminates. The average backlight test results ranged from 4.6 to 4.9. No ICDs were observed on any of the laminates.

EXAMPLE 5

1.2 g rutin trihydrate was added to a beaker containing 800 ml DI water. 1 N NaOH solution with stirring was added to adjust the solution pH to 11.2. In a separate beaker, 1.65 g silver p-toluenesulfonate was dissolved in 40 ml DI water. The silver ion solution was added to the rutin trihydrate solution with vigorous stirring. A minute after mixing the two solutions, a few milliliters of the solution were taken out and diluted for UV-vis measurement. The spectra were measured using a UV-Vis spectrophotometer 8453 from Agilent. The UV-Vis spectra showed a strong absorption peak around 412 nm, indicating the formation of silver nanoparticles. The molar ratio of silver metal to rutin trihydrate was 1:0.3. The beaker containing the aqueous catalyst solution was placed in a 50° C. water bath for 12 hours to test its stability. No precipitate was observed. The silver nanoparticle solution was tested as a catalyst for electroless copper plating by taking ten aliquots of equal volume from the stock solution and then each aliquot was diluted with DI water to 320 ppm silver and adjusted to pH 3-6 with ascorbic acid or dihydroxybenzoic acid. Ten laminates with a plurality of through-holes were provided: SY-1141, SY-1000-2, TUC-752, 370HR (from Isola), and NP-175 (from Nanya). The catalyst initiated electroless plating on all of the laminates. All of the laminates were bright shinny and smooth in appearance. Five of the laminates were tested for adhesion. All passed the Scotch tape test. Backlight performance was tested on the five laminates and the average values were between 4.5 and 4.8, which are generally accepted by industrial standards. The remaining five laminates were analyzed for ICDs as described in Example 3. No ICDs were detected on the five laminates.

EXAMPLE 6

Robinin/silver colloidal nanoparticle catalyst is prepared by dissolving 1.07 g robinin in a beaker containing 800 ml DI water at room temperature. 1 N NaOH solution is added with stirring to adjust the solution pH to 11. In a separate beaker, 1.42 g silver p-toluenesulfonate is dissolved in 40 ml DI water. The silver ion solution is added to the robinin solution with vigorous stirring. The molar ratio of silver metal to robinin is 1:0.28. The beaker containing the aqueous catalyst solution is placed in a 50° C. water bath for 12 hours to test its stability. After 12 hours the solution is observed and no precipitate is expected indicating that the catalyst is still stable.

The rubinin/silver catalyst is diluted with sufficient amount of DI water such that the concentration of the catalyst is 300 ppm silver. The pH of the catalyst solution is adjusted to 3 with a sufficient amount of ascorbic acid. The catalyst solution is used to electrolessly plate copper on TUC-662 laminates with a plurality of through-holes according to the preparation and plating procedure described in Example 3. The plated copper laminates are expected to be bright and shinny with a smooth appearance and pass the Scotch tape test. No ICDs are expected to be observed on the laminates. The copper plated laminates are sectioned and 10 through-holes of each laminate are examined for backlight performance. The average backlight values are expected to range from 4.5 to 4.8.

EXAMPLE 7

Hesperidin/silver colloidal nanoparticle catalyst is prepared by dissolving 1.65 g hesperidin in a beaker containing 800 ml DI water at room temperature. 1 N NaOH solution with stirring is added to adjust the solution pH to 11. In a separate beaker, 2.2 g silver p-toluenesulfonate is dissolved in 60 ml DI water. The silver ion solution is added to the hesperidin solution with strong stirring. The molar ratio of silver to hesperidin is 1:0.34. The beaker containing the aqueous catalyst solution is placed in a 50° C. water bath for 12 hours to test its stability. After 12 hours the solution is observed and no precipitate is expected indicating that the catalyst is still stable.

The hesperidin/silver catalyst is diluted with sufficient amount of DI water such that the concentration of the catalyst is 300 ppm silver. The pH of the catalyst solution is adjusted to 3 with a sufficient amount of dihydroxybenzoic acid. The catalyst solution is used to electrolessly plate copper on SY-1141 laminates with a plurality of through-holes according to the preparation and plating procedure described in Example 3. The plated copper laminates are expected to be bright and shinny with a smooth surface and pass the Scotch tape test. No ICDs are expected to be observed on the laminates. The copper plated laminates are sectioned and 10 through-holes of each laminate are examined for backlight performance. The average backlight values are expected to range from 4.5 to 4.8.

EXAMPLE 8

Diosmin/palladium colloidal nanoparticle catalyst is prepared by dissolving 195 mg diosmin in a beaker containing 500 ml DI water at room temperature. With stirring, 300 mg $Na_2PdCl_4$ in 30 ml DI water is added and the mixture is vigorously stirred using air agitation. 100 mg $NaBH_4$ in 10 ml DI water is then added to the solution with vigorous air agitation. The solution becomes black indicating reduction of palladium ions to palladium metal and the formation of palladium nanoparticles. The molar ratio of palladium to diosmin is 1:0.3. The solution of the catalyst has a pH from 8 to 9 as measured using an ACCUMET AB15 pH meter. The beaker containing the aqueous catalyst solution is placed in a 50° C. water bath for 12 hours to test its stability. After 12 hours the solution is observed and no observable precipitate is expected indicating that the catalyst is still stable.

2 sample aliquots of the diosmin/palladium catalyst of equal volume are removed from the above stock solution and diluted with sufficient amount of DI water such that the concentrations of the catalyst are 50 ppm palladium. The pH of the aliquots is adjusted to 3.5 with a sufficient amount of ascorbic acid. Each is used to electrolessly plate copper on SY-1141 laminates with a plurality of through-holes according to the preparation and plating procedure described in Example 3. The plated copper laminates are expected to be bright with a smooth surface and pass the Scotch tape test. The two copper plated laminates are sectioned and 10 through-holes are examined for backlight performance. The average backlight values are expected to range from 4.5 to 5.

EXAMPLE 9

Quercitrin/palladium colloidal nanoparticle catalyst is prepared by dissolving 195 mg qiercitrin in a beaker containing 750 ml DI water at room temperature. With stirring, 300 mg $Na_2PdCl_4$ in 30 ml DI water is added and the mixture is vigorously stirred using air agitation. 100 mg $NaBH_4$ in 15 ml DI water is then added to the solution with vigorous air agitation. The solution becomes black indicating reduction of palladium ions to palladium metal and the formation of palladium nanoparticles. The solution of the catalyst has a pH of 7 to 8 as measured using an ACCUMET AB15 pH meter. The molar ratio of palladium to quercitrin is 1:0.4. The beaker containing the aqueous catalyst solution is placed in a 50° C. water bath for 12 hours to test its stability. After 12 hours the solution is observed and no observable precipitate is expected indicating that the catalyst is still stable.

2 sample aliquots of the quercitrin/palladium catalyst of equal volume are removed from the above stock solution and diluted with sufficient amount of DI water such that the concentrations of the catalyst are 50 ppm palladium. The pH of the aliquots is adjusted to 4 with a sufficient amount of ascorbic acid. Each is used to electrolessly plate copper on NPG-150 laminates according to the method described in Example 3. The plated copper laminates are expected to be bright with a smooth surface and are expected to pass the Scotch tape test. The two copper plated laminates are sectioned and 10 through-holes are examined for backlight performance. The average backlight values are expected to range from 4.5 to 5.

EXAMPLE 10

Myricetin 3-rhamnoside/silver colloidal nanoparticle catalyst is prepared by dissolving 1.04 g myricetin 3-rhamnoside in a beaker containing 750 ml DI water at room temperature. With stirring, 1 N NaOH solution is added to adjust the solution pH to 11. In a separate beaker, 1.4 g silver p-toluenesulfonate is dissolved in 40 mL DI water. The silver ion solution is added to the myricetin 3-rhamnoside solution with vigorous stirring. The molar ratio of silver to myricetin 3-rhamnoside is 1:0.4. The beaker containing the aqueous catalyst solution is placed in a 50° C. water bath for 12 hours to test its stability. After 12 hours the solution is observed and no precipitate is expected indicating that the catalyst is still stable.

The myricetin 3-rhamnoside/silver catalyst is diluted with sufficient amount of DI water such that the concentration of the catalyst is 300 ppm silver. The pH of the catalyst solution is adjusted to 3 with a sufficient amount of dihydroxybenzoic acid. The catalyst solution is used to electrolessly plate copper on NPG-150 laminates with through-holes according to the preparation and plating procedure described in Example 3. The plated copper laminates are expected to be bright and shinny with smooth surfaces and pass the Scotch tape test. No ICDs are expected to be observed on the laminates. The copper plated laminates are sectioned and 10 through-holes of each laminate are examined for backlight performance. The average backlight values are expected to range from 4.5 to 4.8.

What is claimed is:

1. An aqueous catalyst solution comprising one or more reducing agents and nanoparticles comprising one or more sources of precious metals chosen from silver salts, platinum salts, palladium salts and iridium salts and one or more flavonoid glycosides and hydrates thereof.

2. The aqueous catalyst solution of claim 1, wherein the one or more flavanoid glycosides have a general formula:

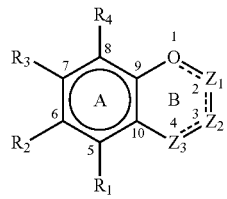

(I)

wherein $R_1$, $R_2$, $R_3$ and $R_4$ are independently hydrogen, hydroxyl, linear or branched ($C_1$-$C_6$)alkoxy, linear or branched ($C_1$-$C_6$)acetate or —O-carbohydrate; $Z_1$ is >C=O or a structure having formula:

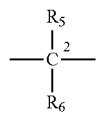

(II)

wherein $R_5$ and $R_6$ are independently hydrogen, or ring C, when $Z_1$ forms a double bond with the carbon at position 3 of ring B, only one of $R_5$ and $R_6$ is present and joined to the carbon at position 2; $Z_2$ is a structure having formula:

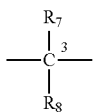

(III)

wherein $R_7$ and $R_8$ are independently hydrogen, hydroxyl, ring C or —O-carbohydrate, when $Z_2$ forms a double bond with the carbon at position 2 or 4 of ring B, only one of $R_7$ and $R_8$ is present and joined with the carbon of position 3; $Z_3$ is >C=O or a structure having formula:

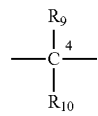

(IV)

wherein $R_9$ and $R_{10}$ are hydrogen, when $Z_3$ forms a double bond with the carbon at position 3 of ring C, only one of $R_9$ and $R_{10}$ is present and joined to the carbon at position 4; and wherein ring C has the following formula:

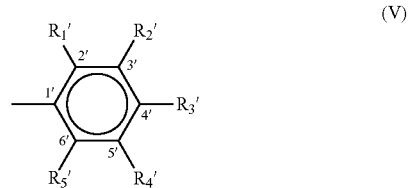

(V)

wherein $R_{1'}$, $R_{2'}$, $R_{3'}$, $R_{4'}$ and $R_{5'}$ of ring C are independently hydrogen, hydroxyl, linear or branched ($C_1$-$C_6$) alkoxy, linear or branched ($C_1$-$C_6$)acetate or —O-carbohydrate, wherein at least one of ring A, B or C includes —O-carbohydrate.

3. The aqueous catalyst solution of claim 1, wherein the nanoparticles are 1 nm to 1000 nm.

4. The aqueous catalyst solution of claim 1, wherein a molar ratio of one or more precious metals to the one or more flavonoid glycosides and hydrates ranges from 1:0.1 to 1:5.

5. The aqueous catalyst solution of claim 1, wherein the one or more reducing agents are chosen from dimethylamine borane, sodium borohydride, ascorbic acid, iso-ascorbic acid, sodium hypophosphite, hydrazine hydrate, formic acid and formaldehyde.

6. The aqueous catalyst solution of claim 1, further comprising one or more acids, one or more antioxidants or mixtures thereof.

7. The aqueous catalyst solution of claim 6, wherein the one or more antioxidants are chosen from ascorbic acid, phenolic acid, polyphenolic compounds, gallic acid, hydroxybenzoaldehydes, catechol, hydroquinone and catechin.

8. The aqueous catalyst solution of claim 6, wherein the one or more acids are chosen from inorganic acids and organic acids.

9. The aqueous catalyst solution of claim 8, wherein the one or more inorganic acids are chosen from hydrochloric acid, sulfuric acid and nitric acid.

10. The aqueous catalyst solution of claim 8, wherein the one or more organic acids are chosen from benzoic acid, derivatives of benzoic acid, ascorbic acid, iso-ascorbic acid, malic acid, maleic acid, gallic acid, acetic acid, citric acid, oxalic acid and tartaric acid.

* * * * *